United States Patent [19]
Antonov et al.

[11] 4,143,839
[45] Mar. 13, 1979

[54] APPARATUS FOR COMBATING ROLLING MOVEMENTS OF AIRCRAFT

[76] Inventors: Oleg K. Antonov, ulitsa Ogareva, 1; Valentin T. Maslov, ulitsa Nevskaya, 7a, kv. 1; Alexei F. Voitko, ulitsa Deputatskaya, 7, kv. 43, all of Kiev, U.S.S.R.

[21] Appl. No.: 828,765

[22] Filed: Aug. 29, 1977

[51] Int. Cl.² .............................................. B64C 13/16
[52] U.S. Cl. ............................... 244/76 R; 244/90 A; 244/203; 244/213
[58] Field of Search ............... 244/50, 51, 53 R, 76 R, 244/76 A, 78, 90 R, 90 A, 175, 179, 183–186, 203, 213, 216

[56] References Cited
U.S. PATENT DOCUMENTS

| | | | |
|---|---|---|---|
| 2,261,363 | 11/1941 | Griswold | 244/90 A |
| 3,160,367 | 12/1964 | Lecarme | 244/76 R |
| 3,977,630 | 8/1976 | Lewis et al. | 244/216 |

*Primary Examiner*—Stephen G. Kunin
*Attorney, Agent, or Firm*—Lackenbach, Lilling & Siegel

[57] ABSTRACT

The apparatus operates to prevent the rolling of an aircraft having an even number of propulsion units when one of the propulsion units stops operating due to a breakdown. Spoilers are mounted on the outboard wings. Each spoiler has an individual drive connected to a power circuit via a control valve which, in turn, is functionally associated with a failure detector of the propulsion unit disposed on the outboard wing opposite to that on which the respective spoiler is mounted. The apparatus is provided with an apparatus that is brought into action automatically, so as to counteract the rolling tendency of an aircraft when one of its propulsion units fails, or with a manual control for correcting the glide-path during landing, dissipating the lift and applying the aerodynamic braking during the landing roll.

5 Claims, 2 Drawing Figures

APPARATUS FOR COMBATING ROLLING MOVEMENTS OF AIRCRAFT

FIELD OF THE INVENTION

The present invention relates to aircraft engineering and, more particularly, to aircraft control systems and devices, and can be used as a suitable means for preventing the tendency of an aircraft to roll when one of the propulsion units (engines) of said aircraft fails to operate due to a breakdown, as well as for correcting the glidepath of the aircraft during its descent.

DESCRIPTION OF THE PRIOR ART

Known in the art are so-called sideslip control units and engine failure compensating units (cf F. I. Sklyansky "Supersonic Aircraft Control", "Mashinostroyeniye" Publishers, Moscow, 1964, p. 302/in Russian/), which, owing to a very high speed action, manage to appropriately move the rudder and ailerons so as to counteract the sideslipping and rolling tendencies of an aircraft.

The prior art sideslip control unit ordinarily incorporates a sensitive element activated in response to a change in the sideslip angle. The engine failure compensating unit comprises pickups measuring the factor of operation of each engine, controlling elements (valves), servomechanisms activating the power supply sources, and actuators of the rudder and ailerons.

The above units being single-action devices, their inclusion into the rudder and aileron control channels of the aircraft complicates the control of the aircraft and greatly reduces the reliability of the control system.

Besides, the presence of the independent power supply sources required to ensure the operation of the rudder and aileron actuators, as well as the auxiliary equipment for normal functioning of said power supply sources, proves detrimental to the operational reliability of the devices designed to counteract the sideslipping and rolling tendencies of an aircraft.

For fast response, the aforesaid devices require powerful actuators and a considerable consumption of energy, well in excess of that needed for the basic control channels. A failure of the auxiliary power supply source inevitably leads to a failure of the entire device.

To enhance the operational reliability of such devices would call for a complicated equipment design which, in turn, would make the entire control system more complex and add to the total weight of the aircraft.

There is known a device for improving the efficiency of the ailerons by tapping compressed air from the engine compressor and blowing it along the upper surface of that aileron which is disposed on the same side of the aircraft fore-and-aft axis as the stopped engine (cf. British Pat. No. 844,520; Cl. 4cI).

A serious disadvantage of this device is the need for an increased air flow which in turn calls for extra engine power or, alternatively, auxiliary compressors or accumulators of air under pressure, which results in a greater weight of the entire aircraft.

Despite the presence of the device improving the efficiency of the ailerons, there is a delay in counteracting the aircraft rolling since it is dependent upon the reaction of the human pilot.

SUMMARY OF THE INVENTION

It is, therefore, an object of the present invention to provide an apparatus for counteracting the rolling of an aircraft, which assures dependable and stable operation under varying aerodynamic conditions of flight of the aircraft.

Another object of the present invention is to provide an apparatus for counteracting the rolling of an aircraft, which features a fast response and increases to flying safety.

Still another object of the invention is to provide an apparatus for counteracting the rolling of an aircraft, which improves the landing performance characteristics of an aircraft.

Yet another object of the present invention is to provide an apparatus featuring the above advantages and which does not complicate the basic control channels and can be brought into action automatically, so as to oppose the rolling tendency of an aircraft when one of the propulsion units of said aircraft fails to operate due to a breakdown, or manually, during landing for correcting the glidepath, dissipating the lift and applying aerodynamic braking during the landing roll.

These and other objects are attained by an apparatus for counteracting the rolling of an aircraft with an even number of propulsion units when one of the propulsion units fails to operate due to a breakdown, in which apparatus there are provided propulsion unit failure detectors and a power circuit comprising a power supply source, control valves and control surface actuators. This apparatus is characterized by the presence of spoilers mounted on the wings and arranged to be moved by individual drives connected to the power circuit via a control valve which, in turn, is functionally coupled with the failure detector of the propulsion unit disposed on the side opposite to that having the respective spoiler. The power circuit is connected to the power supply source (a source of air under pressure) via an interlocking valve arranged to by a takeoff sensing means.

Such an embodiment of the present invention permits a speedy and dependable restoration of the balance of the aircraft when one of the propulsion units of said aircraft fails, irrespective of the pilot's subjective reaction, thereby providing for more adequate flying safety.

According to one of the embodiments, the power circuit may feature a compressed air line extending between the engines and the actuating air jacks, the air in such a line being tapped from the compressor of each engine to be then fed via non-return valves and a common conduit to the actuating air jacks through a pneumatically-actuated valve associated with a flat actuator.

Such an embodiment does not add to the complexity of the basic control channels, for instance, those of the rudder and ailerons, and does not affect their reliability. For its operation, the proposed apparatus requires but an insignificant amount of air which is bled for the purpose from the engine compressors without appreciably affecting their power. Thus, no extra engine power or auxiliary high-power compressors are required, which results in reducing the weight of the aircraft.

Besides, such an embodiment assures more adequate flying safety, since, with the flaps retracted, the pneumatically-actuated valve does not allow the air under pressure into the actuating jack control valves, thus precluding operation of the apparatus in response to a false electric signal appearing across the control circuit of said valves.

According to an alternative embodiment of the present invention, the hydraulic system of the aircraft may be used as the power circuit incorporating the actuating jacks, and the interlocking valve is solenoid-operated.

Such an embodiment allows an increase in the control power of the spoiler actuating jacks, minimizes its size, reduces the number of associated pipelines and decreases the weight and dimensions of the apparatus. Besides, the presence of the interlocking solenoid-operated valve in the power circuit of the actuating jacks safeguards against accidental operation of the apparatus in the event of a single failure, as well as improves the performance of said apparatus.

According to yet another embodiment of the present invention, an apparatus is provided wherein the engine failure detectors are functionally associated with the interlocking valve via a takeoff sensing means, which is made as limit switches arranged to close the electrical circuit when the throttle levers are brought to the takeoff position.

Such an embodiment adds to the reliability of the operation of the apparatus in counteracting the aircraft rolling that occurs due to a failure of an engine.

According to still another embodiment of the present invention, there may be employed a manual control of the spoilers, which features a contactor whose normally-open contacts are functionally associated with each control valve via a limit switch arranged to close the electrical circuit when the flaps are brought to the landing position.

Such an embodiment helps to improve the landing performance characteristics of the aircraft by correcting its descending path, dissipating the lift, and applying aerodynamic braking during the landing roll.

BRIEF DESCRIPTION OF THE DRAWINGS

The invention will now be described in greater detail with reference to specific embodiments thereof, taken in conjunction with the accompanying drawings, wherein.

DETAILED DESCRIPTION OF THE INVENTION

Figure 1:
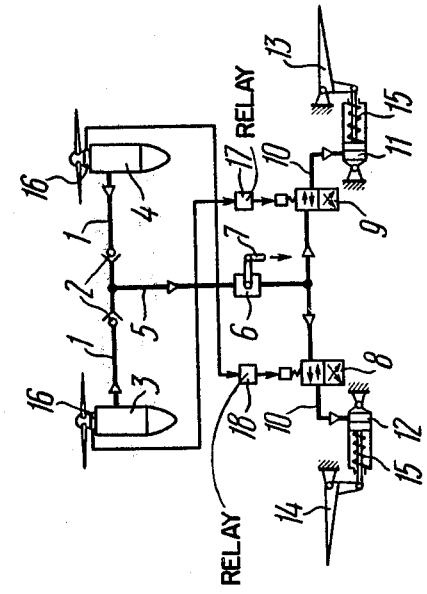
FIG. 1 is a schematic diagram of an apparatus for combating the rolling movements of an aircraft (with a bleed-air drive)

Referring to FIG. 1, the apparatus for combating the rolling movements of an aircraft comprises pipes 1 connecting, via non-return valves 2, the spaces aft of the compressors of the port engine 3 and the starboard engine 4 to a common conduit 5 used for supplying air under pressure. The conduit 5 is connected, via an interlocking valve 6 (featured as a pneumatically-actuated valve) coupled with a flap actuator 7, to electro-pneumatic valves 8 and 9 which, in turn, are connected via pipes 10 to air jacks 11 and 12. The air jacks 11 and 12 serve as actuators of spoilers 13 and 14 and accommodate springs 15.

Centrifugal sensors 16 of the port and starboard engines are electrically connected to relays 17 and 18 that supply power to the windings of the electro-pneumatic valves 8 and 9.

The spoilers 13 and 14 and 22 and 23 (FIG. 2) are control surfaces located on the upper surface of the wings along their tips.

The spoilers 13 and 14 and 22 and 23 may also be placed above the flaps and ailerons.

In the aircraft according to the invention, the apparatus for opposing the rolling tendency may employ spoilers placed on the outboard wing above the ailerons as well as spoilers located anywhere on the wing along its span.

The spoilers 13 and 14 and 22 and 23 may be installed to be used specifically with the proposed apparatus, or existing control surfaces intended for other purposes may be employed.

The compressed air tapped from aft of the compressors of the running engines 3 and 4 is fed via the pipes 1 and the non-return valves 2 to the common conduit 5, from which it is constantly available upstream of the pneumatically operated valve 6 connected to the flap actuator 7. As the flaps are lowered (prior to takeoff or landing), the pneumatically-operated valve 6 opens to allow the air under pressure to flow into the electro-pneumatic valves 8 and 9.

In the event of failure of the port engine 3, the centrifugal sensor 16, that recognizes the failure of that engine will send a signal to a relay 17. The relay will close the electrical circuit that controls the electro-pneumatic valve 9. The valve 9 operates thus allowing the air under pressure into the air jack 11 which deflects the spoiler 13 of the starboard wing, thereby preventing the rolling tendency of the aircraft.

In the event of failure of the starboard engine 4, the centrifugal sensor 16, that recognizes that the failure of engine, will furnish a signal to a relay 18. The relay will close the electrical circuit that controls the electro-pneumatic valve 8. The valve 8 operates. As a consequence, the air under pressure will pass into the air jack 12 which will deflect the spoiler 14 of the port wing, thereby preventing the rolling tendency of the aircraft.

The spoilers 13 and 14 will be restored to their initial position by means of the springs 15 and the air pressure will be relieved via the electro-pneumatic valves 8 and 9. As the flaps are lifted, the pneumatically-operated valve 6 will seal off the air under pressure from the electro-pneumatic valves 8 and 9, thus precluding actuation of the apparatus in a cruising flight in response to a false electrical signal.

Figure 2:
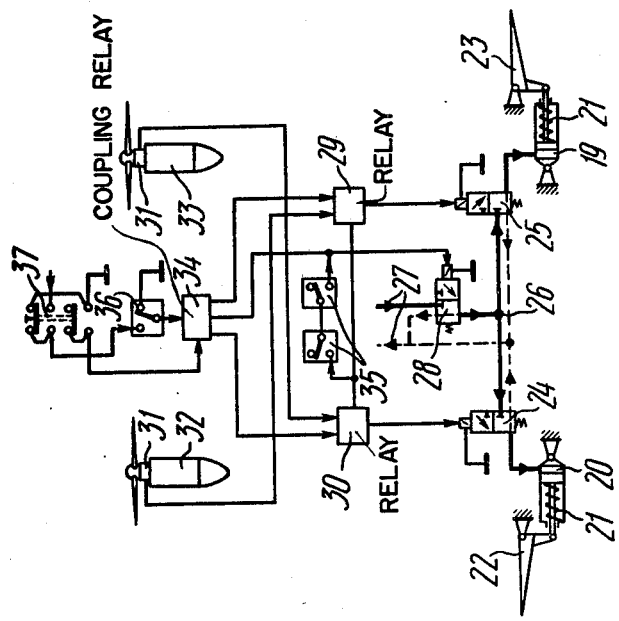
FIG. 2 is a schematic diagram of an alternative embodiment of the apparatus for combating the rolling movements of an aircraft (with a hydraulic drive).

Referring now to FIG. 2, the apparatus for combating the rolling movements of an aircraft comprises hydraulic jacks 19 and 20 accommodating springs 21 and having rods hinged to spoilers 22 and 23 and cylinders connected to the wing structural members.

The hydraulic jacks 19 and 20 are connected, via solenoid-operated valves 24 and 25, used for retraction and lowering of the spoilers 22 and 23, to a common duct 26 along which the working fluid is fed from the hydraulic system 27 via a solenoid-operated valve 28.

The windings of the spoiler control solenoid-operated valves 24 and 25 are electrically connected to relays 29 and 30, which, in turn, are electrically connected to sensors 31 on the port engine 32 and the starboard engine 33, respectively, as well as a decoupling relay 34 and, via a takeoff sensing means made as limit switches 35 that close when the throttle levers are set to the takeoff position, to the winding of the solenoid-operated valve 28. The windings of the solenoid-operated valve 28 is electrically connected to the relay 34.

The relay 34 is connected by one line passing via the normally-open contacts of the limit switch 36, which locks the spoilers in the retracted position until, for example, the flaps are set to the required position, to one normally-closed contact of an electrical contactor 37 that controls the spoilers and by another line, having no interlocking element, to the normally-open contact of the electrical contactor 37.

The operation of the apparatus in the automatic mode can be described as follows.

During takeoff, the limit switches 35 are closed by bringing the throttle levers to the takeoff position.

In the event of failure of the port engine 32, the sensor 31 recognizes the failure and sends a signal to the relay 29. The relay 29 closes the electrical circuits of the solenoid-operated valve 28, which supplies the working fluid from the hydraulic system 27 into the common duct 26, and of the solenoid-operated valve 25 used for retraction and extension of the spoiler 23. The valves 28 and 25 operate. As a consequence, the working fluid under pressure is furnished into the hydraulic jack 19 which deflects the spoiler 23 of the starboard wing so as to counteract the rolling tendency.

In the event of failure of the starboard engine 33, the sensor 31 recognizes the failure and sends a signal to the relay 30. The relay 30 closes the electrical circuits of the solenoid-operated valve 28, which supplies the working fluid from the hydraulic system 27 into the common duct 26, and of the solenoid-operated valve 24 used for retraction and extension of the spoiler 22. The valves 28 and 24 operate. As a consequence, the working fluid under pressure is fed into the hydraulic jack 20 which deflects the spoiler 22 of the port wing so as to counteract the rolling tendency.

The spoilers 22 and 23 are retracted by means of the springs 21, and the working fluid is returned from the hydraulic jacks via the de-energized valves 24 and 25 into the return line of the hydraulic system 27.

When at least one of the limit switches 35, normally closed when the throttle levers are set to the takeoff position, opens its contacts, the valve 28 becomes de-energized and the working fluid is fed from the common duct 26 into the return line of the hydraulic system 27, thereby allowing the springs 21 to retract both spoilers.

During descent, the spoilers are operated to correct the glidepath of the aircraft, and the proposed apparatus functions as follows.

The limit switch 36, which locks the spoilers in the retracted position unless, for example, the flaps are brought to the required position, is closed.

With the electrical contactor 37 being closed, the relay 34 is energized. The relay 34 energizes the solenoid-operated valve 28 which supplies the working fluid from the hydraulic system 27 into the common duct 26 and, via the relays 29 and 30, the solenoid-operated valves 24 and 25 which control the symmetrical hydraulic jacks 19 and 20. The valves 28, 24 and 25 operate and pass the working fluid under pressure into the hydraulic jacks 19 and 20 which deflect the spoilers 22 and 23 to the required position.

When the electrical contactor 37 which controls the spoilers opens its contacts or when the limit switch 36 which locks the spoilers in the retracted position opens its contacts, the valves 28, 24 and 25 are de-energized, and the working fluid is passed from inside the hydraulic jacks 19 and 20 via the valves 24 and 25 into the return line of the hydraulic system 27, the spoilers 22 and 23 being restored to the retracted position by means of the springs 21.

What is claimed is:

1. An apparatus for combating the rolling movements of an aircraft with an even number of propulsion units when one of the propulsion units fails to operate due to a breakdown, comprising: propulsion unit failure detectors; a power circuit incorporating an energy source, control valves and control surface actuators; spoilers mounted on outboard wings of said aircraft and having individually actuated drives connected to said power circuit via one of said control valves which, in turn is functionally associated with a respective failure detector of the propulsion unit disposed on the outboard wing opposite to that mounting said spoiler; an interlocking valve through which said power circuit is connected to said energy source; and a takeoff sensing means functionally associated with said interlocking valve to actuate it.

2. An apparatus as claimed in claim 1, wherein the power circuit features a compressed air line extending between said propulsion units and actuating air jacks, the air in said line being tapped from a compressor of each propulsion unit to be then fed via nonreturn valves and a common conduit to the actuating air jacks through a pneumatically-operated valve linked to a flap actuator.

3. An apparatus as claimed in claim 1, wherein the hydraulic system of the aircraft is used as the power circuit, the interlocking valve being solenoid-operated.

4. An apparatus as claimed in claim 1, wherein, the propulsion and failure detectors are functionally associated with the interlocking valve via the takeoff sensing means, the takeoff serving means being made as limit switches closing the power circuit when throttle levers are brought to the takeoff position.

5. An apparatus as claimed in claim 1, wherein manual control of the spoilers is provided by a contactor whose normally-open contacts are functionally associated with each control valve via a limit switch arranged to close the power circuit when flaps of said aircraft are brought to the landing position.

* * * * *